United States Patent
Kudo

(10) Patent No.: US 8,117,442 B2
(45) Date of Patent: Feb. 14, 2012

(54) DATA PROCESSOR

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1056 days.

(21) Appl. No.: 12/003,114

(22) Filed: Dec. 20, 2007

(65) Prior Publication Data
US 2008/0163343 A1 Jul. 3, 2008

(30) Foreign Application Priority Data
Dec. 27, 2006 (JP) ................ P2006-353434

(51) Int. Cl.
*H04L 29/06* (2006.01)
*H04L 9/32* (2006.01)
*G06F 7/04* (2006.01)
*G06F 7/00* (2006.01)
*H04N 7/167* (2011.01)

(52) U.S. Cl. ........ 713/166; 713/151; 713/155; 713/161; 713/170; 726/2; 726/27; 380/232; 380/241; 707/790; 707/802; 707/803

(58) Field of Classification Search .......... 726/4, 2, 726/27; 713/151, 155, 161, 166, 170; 380/232, 380/241; 707/790, 802, 803
See application file for complete search history.

(56) References Cited

U.S. PATENT DOCUMENTS

| 7,499,661 | B2* | 3/2009 | Ikeda .................... 399/87 |
| 7,656,547 | B2* | 2/2010 | Kuo et al. ............. 358/1.15 |
| 2002/0101603 | A1* | 8/2002 | Christodoulou et al. .... 358/1.14 |
| 2003/0226039 | A1 | 12/2003 | Maki |
| 2006/0188284 | A1* | 8/2006 | Ikeda .................... 399/82 |

FOREIGN PATENT DOCUMENTS

| EP | 883276 A2 * | 12/1998 |
| JP | 2004-054893 | 2/2004 |
| JP | 2004-213534 | 7/2004 |

* cited by examiner

*Primary Examiner* — Mohammed Reza
(74) *Attorney, Agent, or Firm* — Baker Botts L.L.P.

(57) ABSTRACT

A data processor is connected to and communicating with an external device having at least one predetermined communication/authentication method. A first assigning unit assigns a first level of priority to each combination having a plurality of first type methods including a communication and authentication method. A first selecting unit selects a combination in order from the highest grade to the lowest grade of the first level. A second determining unit determines whether at least one of the plurality of the first type methods corresponds to a prescribed method. A canceling unit cancels the selection of the combination selected by the first selecting unit when the second determining unit determines that at least one of the plurality of the first type methods corresponds to the prescribed method.

17 Claims, 9 Drawing Sheets

FIG.4(a)

| CONNECTION FORMULA 1 | SMTP CONNECTION = SMTP CONNECTION METHOD * SMTP AUTHENTICATION METHOD |
| --- | --- |
| CONNECTION FORMULA 2 | SMTP CONNECTION METHOD = (SMTP: SSLv3, SMTP: SSLv2, SMTP: PLAIN TEXT COMMUNICATIONS) |
| CONNECTION FORMULA 3 | SMTP AUTHENTICATION METHOD = (SMTP: MD5 AUTHENTICATION, SMTP: Plain AUTHENTICATION, SMTP: POP before SMTP) |
| CONNECTION FORMULA 4 | SMTP: POP before SMTP = POP: COMMUNICATION METHOD * POP: AUTHENTICATION METHOD |
| CONNECTION FORMULA 5 | POP: COMMUNICATION METHOD = (POP: SSLv3, POP: SSLv2, POP: PLAIN TEXT COMMUNICATIONS) |
| CONNECTION FORMULA 6 | POP: AUTHENTICATION METHOD = (POP: APOP AUTHENTICATION, POP: Plain AUTHENTICATION) |

FIG.4(b)

SMTP CONNECTION TABLE

| COMMUNICATION METHOD | COEFFICIENT |
| --- | --- |
| SSLv3 | 1.0 |
| SSLv2 | 0.5 |
| PLAIN TEXT COMMUNICATIONS | 0.1 |

| AUTHENTICATION METHOD | COEFFICIENT |
| --- | --- |
| MD5 AUTHENTICATION | 1.0 |
| Plain AUTHENTICATION | 0.5 |
| POP before SMTP | Pbs TABLE |

FIG.4(c)

Pbs TABLE

| COMMUNICATION METHOD | COEFFICIENT |
| --- | --- |
| SSLv3 | 0.7 |
| SSLv2 | 0.3 |
| PLAIN TEXT COMMUNICATIONS | 0.1 |

| AUTHENTICATION METHOD | COEFFICIENT |
| --- | --- |
| APOP AUTHENTICATION | 0.7 |
| Plain AUTHENTICATION | 0.3 |

PRIORITY TABLE

| METHOD | PRIORITY |
|---|---|
| SMTP: SSLv3 | 3 |
| SMTP: SSLv2 | 3 |
| SMTP: PLAIN TEXT COMMUNICATIONS | 3 |
| SMTP: MD5 AUTHENTICATION | 4 |
| SMTP: Plain AUTHENTICATION | 4 |
| POP: SSLv3 | 1 |
| POP: SSLv2 | 1 |
| POP: PLAIN TEXT COMMUNICATIONS | 1 |
| POP: APOP AUTHENTICATION | 2 |
| POP: Plain AUTHENTICATION | 2 |

(PROCESS EXECUTED ON THE MULTIFUNCTION PERIPHERAL)

FIG.6

| COMBINATION | FORMULA | VALUE OF COEFFICIENT |
|---|---|---|
| 1 | SMTP: SSLv3*SMTP: MD5 AUTHENTICATION | COEFFICIENT=1.0*1.0=1.0 |
| 2 | SMTP: SSLv3*SMTP: Plain AUTHENTICATION | COEFFICIENT=1.0*0.5=0.5 |
| 3 | SMTP: SSLv3*POP: SSLv3*POP: APOP AUTHENTICATION | COEFFICIENT=1.0*0.7*0.7=0.49 |
| 4 | SMTP: SSLv3*POP: SSLv3*POP: Plain AUTHENTICATION | COEFFICIENT=1.0*0.7*0.3=0.21 |
| 5 | SMTP: SSLv3*POP: SSLv2*POP: APOP AUTHENTICATION | COEFFICIENT=1.0*0.7*0.3=0.21 |
| 6 | SMTP: SSLv3*POP: SSLv2*POP: Plain AUTHENTICATION | COEFFICIENT=1.0*0.3*0.3=0.09 |
| 7 | SMTP: SSLv3*POP: PLAIN TEXT COMMUNICATIONS*POP: APOP AUTHENTICATION | COEFFICIENT=1.0*0.1*0.7=0.07 |
| 8 | SMTP: SSLv3*POP: PLAIN TEXT COMMUNICATIONS*POP: Plain AUTHENTICATION | COEFFICIENT=1.0*0.1*0.3=0.03 |
| 9 | SMTP: SSLv2*SMTP: MD5 AUTHENTICATION | COEFFICIENT=0.5*1.0=0.5 |
| 10 | SMTP: SSLv2*SMTP: Plain AUTHENTICATION | COEFFICIENT=0.5*0.5=0.25 |
| 11 | SMTP: SSLv2*POP: SSLv3*POP: APOP AUTHENTICATION | COEFFICIENT=0.5*0.7*0.7=0.245 |
| 12 | SMTP: SSLv2*POP: SSLv3*POP: Plain AUTHENTICATION | COEFFICIENT=0.5*0.7*0.3=0.105 |
| 13 | SMTP: SSLv2*POP: SSLv2*POP: APOP AUTHENTICATION | COEFFICIENT=0.5*0.3*0.7=0.105 |
| 14 | SMTP: SSLv2*POP: SSLv2*POP: Plain AUTHENTICATION | COEFFICIENT=0.5*0.3*0.3=0.045 |
| 15 | SMTP: SSLv2*POP: PLAIN TEXT COMMUNICATIONS*POP: APOP AUTHENTICATION | COEFFICIENT=0.5*0.1*0.7=0.035 |
| 16 | SMTP: SSLv2*POP: PLAIN TEXT COMMUNICATIONS*POP: Plain AUTHENTICATION | COEFFICIENT=0.5*0.1*0.3=0.015 |
| 17 | SMTP: PLAIN TEXT COMMUNICATIONS*SMTP: MD5 AUTHENTICATION | COEFFICIENT=0.1*1.0=0.1 |
| 18 | SMTP: PLAIN TEXT COMMUNICATIONS*SMTP: Plain AUTHENTICATION | COEFFICIENT=0.1*0.5=0.05 |
| 19 | SMTP: PLAIN TEXT COMMUNICATIONS*POP: SSLv3*POP: APOP AUTHENTICATION | COEFFICIENT=0.1*0.7*0.7=0.049 |
| 20 | SMTP: PLAIN TEXT COMMUNICATIONS*POP: SSLv3*POP: Plain AUTHENTICATION | COEFFICIENT=0.1*0.7*0.3=0.021 |
| 21 | SMTP: PLAIN TEXT COMMUNICATIONS*POP: SSLv2*POP: APOP AUTHENTICATION | COEFFICIENT=0.1*0.3*0.7=0.021 |
| 22 | SMTP: PLAIN TEXT COMMUNICATIONS*POP: SSLv2*POP: Plain AUTHENTICATION | COEFFICIENT=0.1*0.3*0.3=0.009 |
| 23 | SMTP: PLAIN TEXT COMMUNICATIONS*POP: PLAIN TEXT COMMUNICATIONS*POP: APOP AUTHENTICATION | COEFFICIENT=0.1*0.1*0.7=0.007 |
| 24 | SMTP: PLAIN TEXT COMMUNICATIONS*POP: PLAIN TEXT COMMUNICATIONS*POP: Plain AUTHENTICATION | COEFFICIENT=0.1*0.1*0.3=0.003 |

FIG.7

| VARIABLE n | FORMULA | COEFFICIENT |
|---|---|---|
| 1 | SMTP: SSLv3*SMTP: MD5 AUTHENTICATION | 1.0 |
| 2 | SMTP: SSLv3*SMTP: Plain AUTHENTICATION | 0.5 |
| 3 | SMTP: SSLv2*SMTP: MD5 AUTHENTICATION | 0.5 |
| 4 | SMTP: SSLv3*POP: SSLv3*POP: APOP AUTHENTICATION | 0.49 |
| 5 | SMTP: SSLv2*SMTP: Plain AUTHENTICATION | 0.25 |
| 6 | SMTP: SSLv2*POP: SSLv3*POP: APOP AUTHENTICATION | 0.245 |
| 7 | SMTP: SSLv3*POP: SSLv3*POP: Plain AUTHENTICATION | 0.21 |
| 8 | SMTP: SSLv3*POP: SSLv2*POP: APOP AUTHENTICATION | 0.21 |
| 9 | SMTP: SSLv2*POP: SSLv3*POP: Plain AUTHENTICATION | 0.105 |
| 10 | SMTP: SSLv2*POP: SSLv2*POP: APOP AUTHENTICATION | 0.105 |
| 11 | SMTP: PLAIN TEXT COMMUNICATIONS* SMTP: MD5 AUTHENTICATION | 0.1 |
| 12 | SMTP: SSLv3*POP: SSLv2*POP: Plain AUTHENTICATION | 0.09 |
| 13 | SMTP: SSLv3*POP: PLAIN TEXT COMMUNICATIONS* POP: APOP AUTHENTICATION | 0.07 |
| 14 | SMTP: PLAIN TEXT COMMUNICATIONS* STMP: Plain AUTHENTICATION | 0.05 |
| 15 | SMTP: PLAIN TEXT COMMUNICATIONS*POP: SSLv3* POP: APOP AUTHENTICATION | 0.049 |
| 16 | SMTP: SSLv2*POP: SSLv2*POP: Plain AUTHENTICATION | 0.045 |
| 17 | SMTP: SSLv2*POP: PLAIN TEXT COMMUNICATIONS* POP: APOP AUTHENTICATION | 0.035 |
| 18 | SMTP: SSLv*POP: PLAIN TEXT COMMUNICATIONS* POP: Plain AUTHENTICATION | 0.03 |
| 19 | SMTP: PLAIN TEXT COMMUNICATIONS*POP: SSLv3* POP: Plain AUTHENTICATION | 0.021 |
| 20 | SMTP: PLAIN TEXT COMMUNICATIONS*POP: SSLv2* POP: APOP AUTHENTICATION | 0.021 |
| 21 | SMTP: SSLv2*POP: PLAIN TEXT COMMUNICATIONS* POP: Plain AUTHENTICATION | 0.015 |
| 22 | SMTP: PLAIN TEXT COMMUNICATIONS*POP: SSLv2* POP: Plain AUTHENTICATION | 0.009 |
| 23 | SMTP: PLAIN TEXT COMMUNICATIONS* POP: PLAIN TEXT COMMUNICATIONS* POP: APOP AUTHENTICATION | 0.007 |
| 24 | SMTP: PLAIN TEXT COMMUNICATIONS* POP: PLAIN TEXT COMMUNICATIONS* POP: Plain AUTHENTICATION | 0.003 |

FIG.8

| VARIABLE n | VARIABLE m=1 | VARIABLE m=2 | VARIABLE m=3 |
|---|---|---|---|
| 1 | SMTP: SSLv3 | SMTP: MD5 AUTHENTICATION | — |
| 2 | SMTP: SSLv3 | SMTP: Plain AUTHENTICATION | — |
| 3 | SMTP: SSLv2 | SMTP: MD5 AUTHENTICATION | — |
| 4 | POP: SSLv3 | POP: APOP AUTHENTICATION | SMTP: SSLv3 |
| 5 | SMTP: SSLv2 | SMTP: Plain AUTHENTICATION | — |
| 6 | POP: SSLv3 | POP: APOP AUTHENTICATION | SMTP: SSLv2 |
| 7 | POP: SSLv3 | POP: Plain AUTHENTICATION | SMTP: SSLv3 |
| 8 | POP: SSLv2 | POP: APOP AUTHENTICATION | SMTP: SSLv3 |
| 9 | POP: SSLv3 | POP: Plain AUTHENTICATION | SMTP: SSLv2 |
| 10 | POP: SSLv2 | POP: APOP AUTHENTICATION | SMTP: SSLv2 |
| 11 | SMTP: PLAIN TEXT COMMUNICATIONS | SMTP: MD5 AUTHENTICATION | — |
| 12 | POP: SSLv2 | POP: Plain AUTHENTICATION | SMTP: SSLv3 |
| 13 | POP: PLAIN TEXT COMMUNICATIONS | POP: APOP AUTHENTICATION | SMTP: SSLv3 |
| 14 | SMTP: PLAIN TEXT COMMUNICATIONS | SMTP: Plain AUTHENTICATION | — |
| 15 | POP: SSLv3 | POP: APOP AUTHENTICATION | SMTP: PLAIN TEXT COMMUNICATIONS |
| 16 | POP: SSLv2 | POP: Plain AUTHENTICATION | SMTP: SSLv2 |
| 17 | POP: PLAIN TEXT COMMUNICATIONS | POP: APOP AUTHENTICATION | SMTP: SSLv2 |
| 18 | POP: PLAIN TEXT COMMUNICATIONS | POP: Plain AUTHENTICATION | SMTP: SSLv3 |
| 19 | POP: SSLv3 | POP: Plain AUTHENTICATION | SMTP: PLAIN TEXT COMMUNICATIONS |
| 20 | POP: SSLv2 | POP: APOP AUTHENTICATION | SMTP: PLAIN TEXT COMMUNICATIONS |
| 21 | POP: PLAIN TEXT COMMUNICATIONS | POP: Plain AUTHENTICATION | SMTP: SSLv2 |
| 22 | POP: SSLv2 | POP: Plain AUTHENTICATION | SMTP: PLAIN TEXT COMMUNICATIONS |
| 23 | POP: PLAIN TEXT COMMUNICATIONS | POP: APOP AUTHENTICATION | SMTP: PLAIN TEXT COMMUNICATIONS |
| 24 | POP: PLAIN TEXT COMMUNICATIONS | POP: Plain AUTHENTICATION | SMTP: PLAIN TEXT COMMUNICATIONS |

DATA PROCESSOR

CROSS REFERENCE TO RELATED APPLICATIONS

This application claims priority from Japanese Patent Application No. 2006-353434 filed Dec. 27, 2006. The entire content of each of these priority applications is incorporated herein by reference.

TECHNICAL FIELD

The present invention relates to a data processor, a method for controlling the data processor, and particularly to a data processor capable of quickly extracting the communication method and authentication method supported by an external device and reducing the control load when there are a plurality of communication methods and authentication methods.

BACKGROUND

In an effort to enhance security, recent network systems employ a plurality of communication and authentication methods. An external device connected to a personal computer (hereinafter abbreviated as "computer") via a network has predetermined supported methods from among the plurality of communication methods and authentication methods. Accordingly, the computer must select and set a combination of communication and authentication methods supported by the external device from the plurality of communication and authentication methods.

An image-forming device disclosed in United States Patent Publication No. 2003/0226039 (corresponding to Japanese Patent Application Publication No. 2004-54893) selects one method from a plurality of authentication methods in order from highest security and attempts to connect to an external device using the selected authentication method. If the external device does not support the selected authentication method, the image-forming device temporarily disconnects from the external device, selects the next authentication method in order of highest security, and reconnects to the external device. The image-forming device continues to select authentication methods in this order from highest security to lowest until an authentication method supported by the external device is selected.

SUMMARY

The technology described above enables the image-forming device to select the authentication method having the highest possible security supported by the external device. However, when the image-forming device must select both an authentication method and a communication method, the number of combinations of authentication methods and communication methods can be enormous. Thus, the process of extracting the combination of a communication method and an authentication method supported by the external device may take a considerable amount of time and may greatly increase the control load on the computer.

In view of the foregoing, it is an object of the present invention to provide a data processor capable of quickly extracting the communication method and authentication method supported by an external device and reducing the control load when there are a plurality of communication methods and authentication methods.

In order to attain the above and other objects, the invention provides a data processor capable of being connected to and communicating with an external device having at least one predetermined communication/authentication method. The data processor includes a first storing unit, a first assigning unit, a first selecting unit, an initiating unit, a first determining unit, a setting unit, a second determining unit, and a canceling unit. The first storing unit stores a plurality of first type combinations, wherein each first type combination has a plurality of first type methods including a communication method and an authentication method. The first assigning unit assigns a first level of priority to each first type combination, wherein the first level includes a plurality of grades from highest grade to lowest grade. The first selecting unit selects a first type combination from the plurality of first type combinations one at a time in order from the highest grade to the lowest grade of the first level. The initiating unit initiates communications with the external device using a first type method in a first type combination selected by the first selecting unit. The first determines unit determines whether a first type method in a first type combination selected by the first selecting unit corresponds to at least one communication/authentication method for the external device. The setting unit sets each first type method in a first type combination selected by the first selecting unit as valid method for communications with the external device when the first determining unit determines that each first type method in a first type combination selected by the first selecting unit corresponds to at least one communication/authentication method for the external device. The second determining unit determines whether at least one of a plurality of first type methods in a first type combination selected by the first selecting unit corresponds to a prescribed method. The canceling unit cancels the selection of a first type combination selected by the first selecting unit when the second determining unit determines that at least one of a plurality of first type methods in the first type combination selected by the first selecting unit corresponds to the prescribed method.

According to another aspects, the invention provides a method for controlling a data processor capable of being connected to and communicating with an external device having at least one predetermined communication/authentication method. The data processor stores a plurality of combinations. Each combination has a plurality of methods including a communication method and an authentication method. The method for controlling the data processor includes assigning a first level of priority to each combination, the first level including a plurality of grades from highest grade to lowest grade, selecting a combination from the plurality of combinations one at a time in order from highest grade to lowest grade of the first level, initiating communications with the external device using a method in a combination selected by the selecting, determining whether a method in a combination selected by the selecting corresponds to the at least one communication/authentication method for the external device, setting each method in a combination selected by the selecting as valid method for communications with the external device when the determining determines that each method in the combination selected by the selecting corresponds to the at least one communication/authentication method for the external device, determining whether at least one of a plurality of methods in a combination selected by the selecting corresponds to a prescribed method, and canceling the selection of a combination selected by the selecting when the determining determines that at least one of a plurality of methods in a combination selected by the selecting corresponds to the predetermined method.

According to still another aspects, the invention provides a computer-readable storage medium storing a set of program instructions executable on a data processor capable of being connected to and communicating with an external device having at least one predetermined communication/authentication method. The data processor stores a plurality of combinations. Each combination has a plurality of methods including a communication method and an authentication method. The program instructions includes assigning a first level of priority to each combination, the first level including a plurality of grades from highest grade to lowest grade, selecting a combination from the plurality of combinations one at a time in order from highest grade to lowest grade of the first level, initiating communications with the external device using a method in a combination selected by the selecting, determining whether a method in a combination selected by the selecting corresponds to the at least one communication/authentication method for the external device, setting each method in a combination selected by the selecting as valid method for communications with the external device when the determining determines that each method in a combination selected by the selecting corresponds to the at least one communication/authentication method for the external device, determining whether at least one of a plurality of methods in a combination selected by the selecting corresponds to a prescribed method, and canceling the selection of a combination selected by the selecting when the determining determines that at least one of a plurality of methods selected by the selecting corresponds to the predetermined method.

BRIEF DESCRIPTION OF THE DRAWINGS

In the drawings:

FIG. 4(a) is an explanatory diagram conceptually illustrating connection formula data stored in a connection formula data storage area;

FIG. 4(b) is an explanatory diagram conceptually illustrating an SMTP connection table stored in an SMTP connection table storage area;

FIG. 4(c) is an explanatory diagram conceptually illustrating a PbS table stored in a PbS table storage area;

FIG. 6 is a table explaining a method of calculating coefficients for combinations 1-24;

FIG. 7 is a table conceptually illustrating a list created based on the results of calculating the coefficients; and FIG. 8 is a table conceptually illustrating a priority list stored in a priority list storage area of RAM.

DETAILED DESCRIPTION

Next, a embodiment of the present invention will be described while referring to the accompanying drawings.

Figure 1:
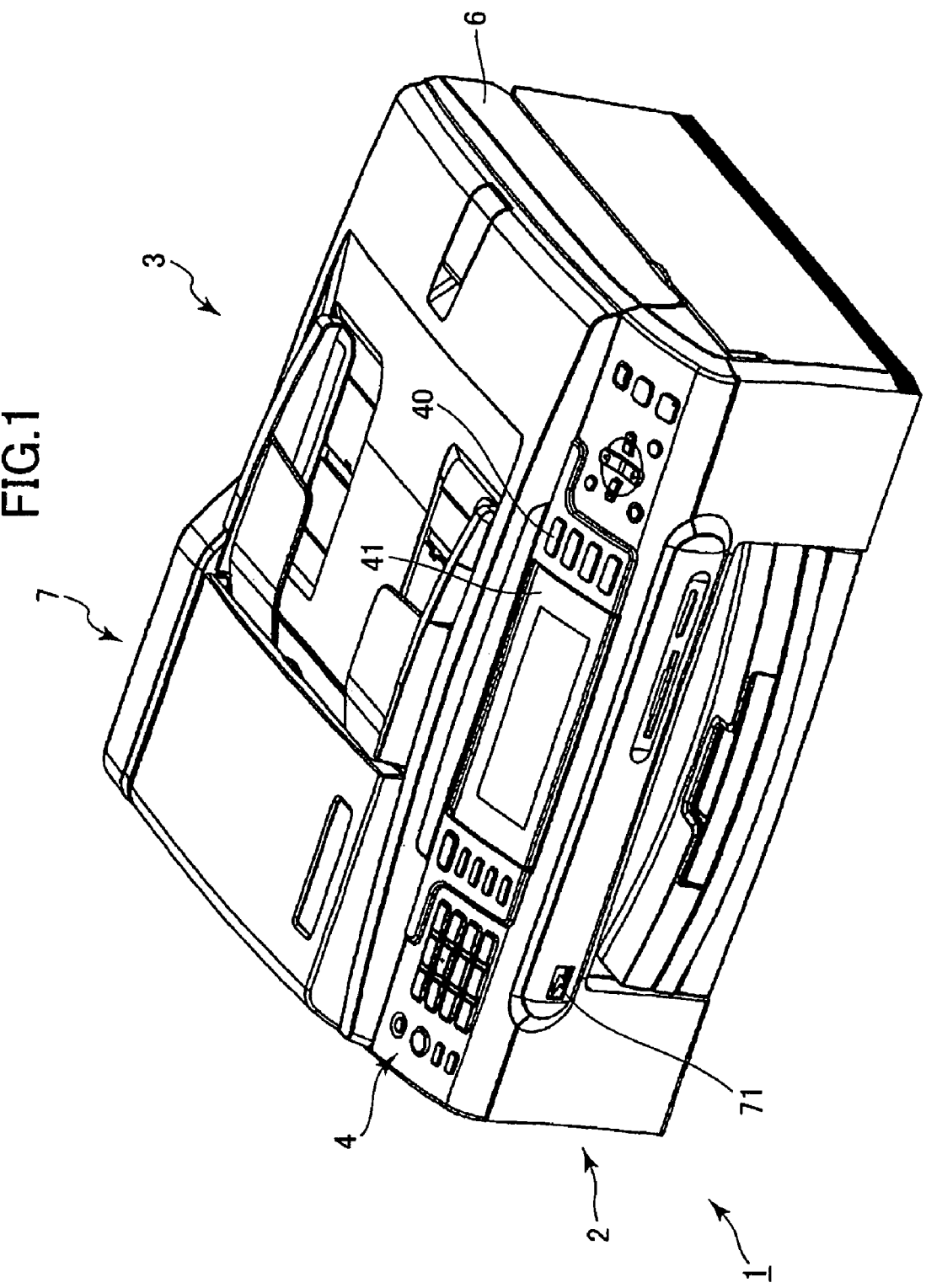
FIG. 1 is a perspective view showing the outer structure of a multifunction peripheral according to a embodiment of the present invention.

FIG. 1 is a perspective view showing the outer structure of a multifunction peripheral 1 according to an embodiment. As shown in FIG. 1, the multifunction peripheral 1 is integrally configured of a printer 2 disposed on the bottom, a scanner 3 disposed on the top, and a control panel 4 provided on the front surface of the scanner 3. The multifunction peripheral 1 implements a scanner function, a copier function, and a facsimile function.

Generally, the multifunction peripheral 1 is connected to a computer (not shown), including computers existing on a network. The multifunction peripheral 1 can record text and images on recording paper based on text and image data received from the computer.

The scanner 3 includes a document scanning bed 6, and an automatic document feeder (hereinafter abbreviated as "ADF") 7 and functions to scan images from an original document placed on the document scanning bed 6 or loaded in the ADF 7. The printer 2 records images on recording paper based on image data scanned by the scanner 3 or image data inputted from an external source.

The control panel 4 provided on the front surface of the multifunction peripheral 1 enables the user to control the printer 2 and the scanner 3 by inputting parameters for various settings. The control panel 4 includes various operating keys 40, and a liquid crystal display (LCD) 41. Using the control panel 4, the user can also input desired commands. When a prescribed command is inputted into the multifunction peripheral 1, a controller 20 (see FIG. 2) controls the operations of the multifunction peripheral 1 based on the inputted data. In addition to commands inputted through the control panel 4, the multifunction peripheral 1 is configured to operate based on commands transmitted from a computer connected to the multifunction peripheral 1 via a printer driver, scanner driver, and to implement operations and functions based on commands received from a computer (external device) on the network via the network interface 30 (see FIG. 2).

Next, the general structure of the controller 20 provided to control the operations of the multifunction peripheral 1 will be described with reference to FIG. 2.

Figure 2:
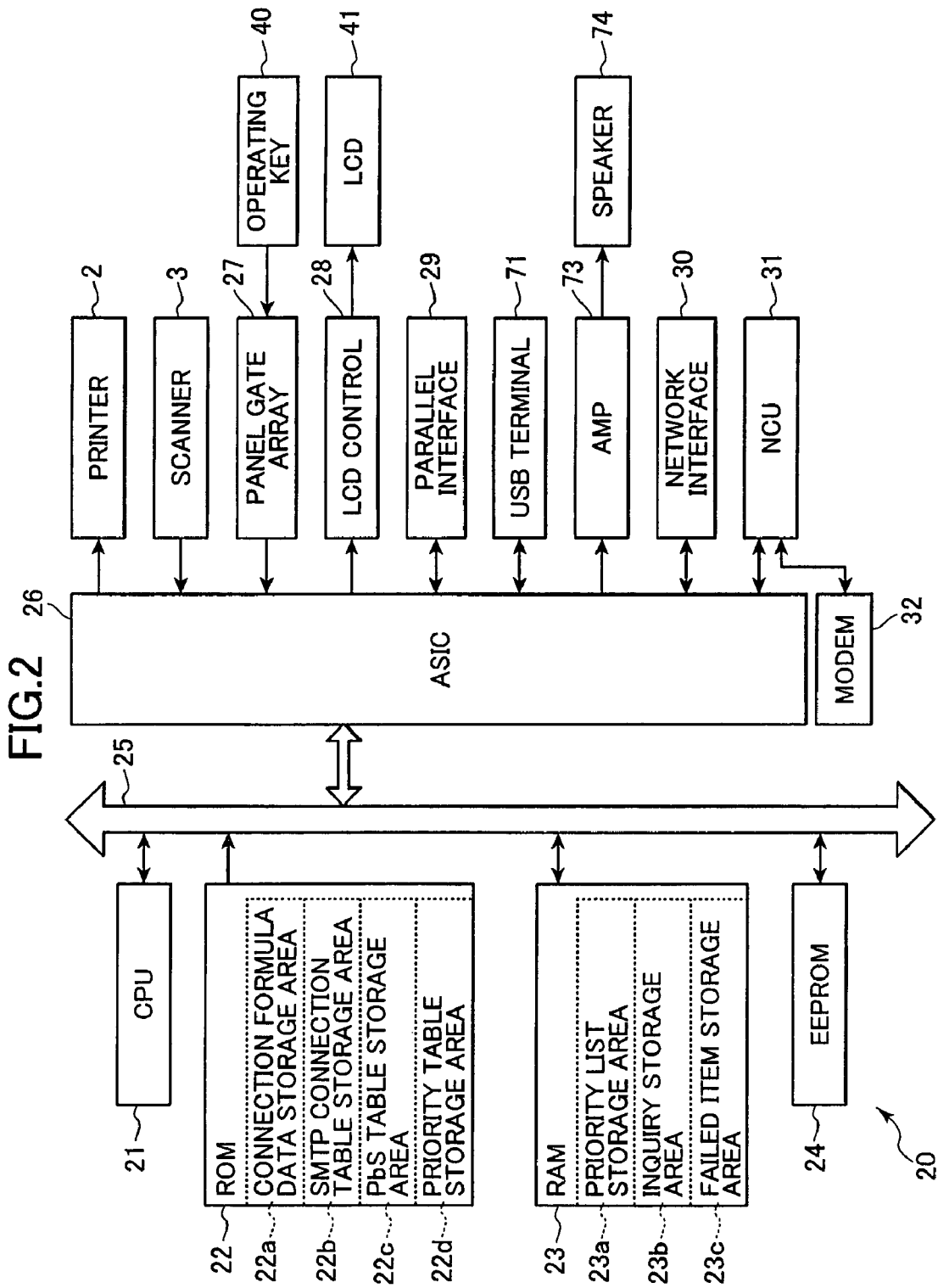
FIG. 2 is a block diagram showing the structure of a controller in the multifunction peripheral.

FIG. 2 is a block diagram showing the structure of the controller 20 in the multifunction peripheral 1. The controller 20 functions to control the overall operations of the multifunction peripheral 1, including the printer 2, the scanner 3, and the control panel 4. As shown in FIG. 2, the controller 20 is configured of a microcomputer primarily including a central processing unit (CPU) 21, a read-only memory (ROM) 22, a random access memory (RAM) 23, and an electrically erasable and programmable ROM (EEPROM) 24, which is a rewritable, nonvolatile storage device. The controller 20 is connected to an application specific integrated circuit (ASIC) 26 via a bus 25.

The CPU 21 is a central processor that performs overall control of the multifunction peripheral 1. The CPU 21 implements various programs, such as a program implementing the process shown in the flowcharts of FIGS. 3(a), 3(b), and 5.

The ROM 22 stores programs for controlling various operations of the multifunction peripheral 1. The ROM 22 includes a connection formula data storage area 22a, an SMTP connection table storage area 22b, a POP before SMTP (PbS) table storage area 22c, and a priority table storage area 22d.

The connection formula data storage area 22a stores connection formula data for creating a priority list described later. The SMTP connection table storage area 22b stores coefficients in association with communication methods and authentication methods constituting an SMTP connection.

The PbS table storage area 22c stores coefficients in association with communication methods and authentication methods constituting POP before SMTP. The priority table storage area 22d stores priorities in association with all communication methods and authentication methods used in the embodiment. All data stored in the connection formula data storage area 22a, the SMTP connection table storage area 22b, the PbS table storage area 22c, and the priority table storage area 22d is read in S102 of a connection setting process described in FIG. 3(a).

The RAM 23 serves as a work area or as a storage area for temporarily storing various data when the CPU 21 executes the above program. The RAM 23 is provided with a priority list storage area 23a, an inquiry storage area 23b, and a failed item storage area 23c.

The priority list storage area 23a stores a plurality of combinations, each of which is configured from a plurality of communication and authentication methods and is assigned a priority. The priority list storage area 23a is initialized (cleared) in S101 of the connection setting process. A new priority list is stored in the priority list storage area 23a in S107 of the connection setting process.

The inquiry storage area 23b stores a sequence of query items. That is, the inquiry storage area 23b stores the query items clarifying its order in which each item is added. Each query item corresponds to a communication method or an authentication method for querying a computer on a network. That is, this sequence is obtained by a combination of communication or authentication methods. In other words, the sequence of query items indicates the combination of the communication or authentication method(s) associated with their order. The inquiry storage area 23b is initialized (cleared) in S101 of the connection setting process. A new query item that constitutes a sequence and corresponds to one of the communication and authentication methods is stored in the inquiry storage area 23b in S112 of the connection setting process.

The failed item storage area 23c stores sequences of query items. That is, the failed item storage area 23c stores the query items clarifying its order. When the CPU 21 queries the combination of the communication and authentication methods to the computer on the network, and the computer does not support on the communication and authentication methods, the CPU 21 stores a sequence of query items each of which corresponds to the communication and authentication method that is queried to the computer. Thus, the failed item storage area 23c stores the items with their querying order. The failed item storage area 23c is initialized (cleared) in S101 of the connection setting process. A new sequence of query item (communication method or authentication method) is stored in the failed item storage area 23c in S122 of the connection setting process.

The ASIC 26 controls the operations of the printer 2, the scanner 3, and the control panel 4 according to commands from the CPU 21. A panel gate is connected to the ASIC 26 for controlling the operating keys 40 by which the user inputs desired commands into the multifunction peripheral 1. When prescribed key codes are received from the panel gate array 27, the CPU 21 performs an appropriate control process according to a prescribed key process table. The key process table associates key codes with key processes and is stored in the ROM 22, for example.

The ASIC 26 is also connected to an LCD controller 28, a parallel inter face 29, a USB terminal 71, an AMP 73, the network interface 30, and a network control unit (NCU) 31.

The LCD control 28 is connected to the ASIC 26 for controlling the content displayed on the LCD 41. The LCD control 28 displays information related to operations of the printer 2 or the scanner 3 on the LCD 41 based on commands from the CPU 21.

The parallel interface 29 and the USB terminal 71 are connected to the ASIC 26 for exchanging data with the computer via a parallel cable or a USB cable. The network control unit (NCU) 31 and a modem 32 are connected to the ASIC 26 for implementing the facsimile function. The amp 73 is connected to the ASIC 26 and to a speaker 74. The amp 73 outputs sounds to the speaker 74, including ringtones, error tones, and messages.

The network interface 30 is connected to the ASIC 26 for connecting with computers on the network. The network interface 30 is capable of connecting to a plurality of computers on the network and for exchanging data with these computers.

Next, the connection setting process for connecting the multifunction peripheral 1 to the computer on the network will be described with reference to FIGS. 3(a) through 8. In the embodiment, the computer on the network signifies a server for transmitting and receiving e-mail, such as a POP server or SMTP server.

The connection setting process for connecting the multifunction peripheral 1 to the computer on the network is performed when the user operates the operating keys 40 and selects the "Establish Connection" function from the plurality of available functions.

Figure 3A:
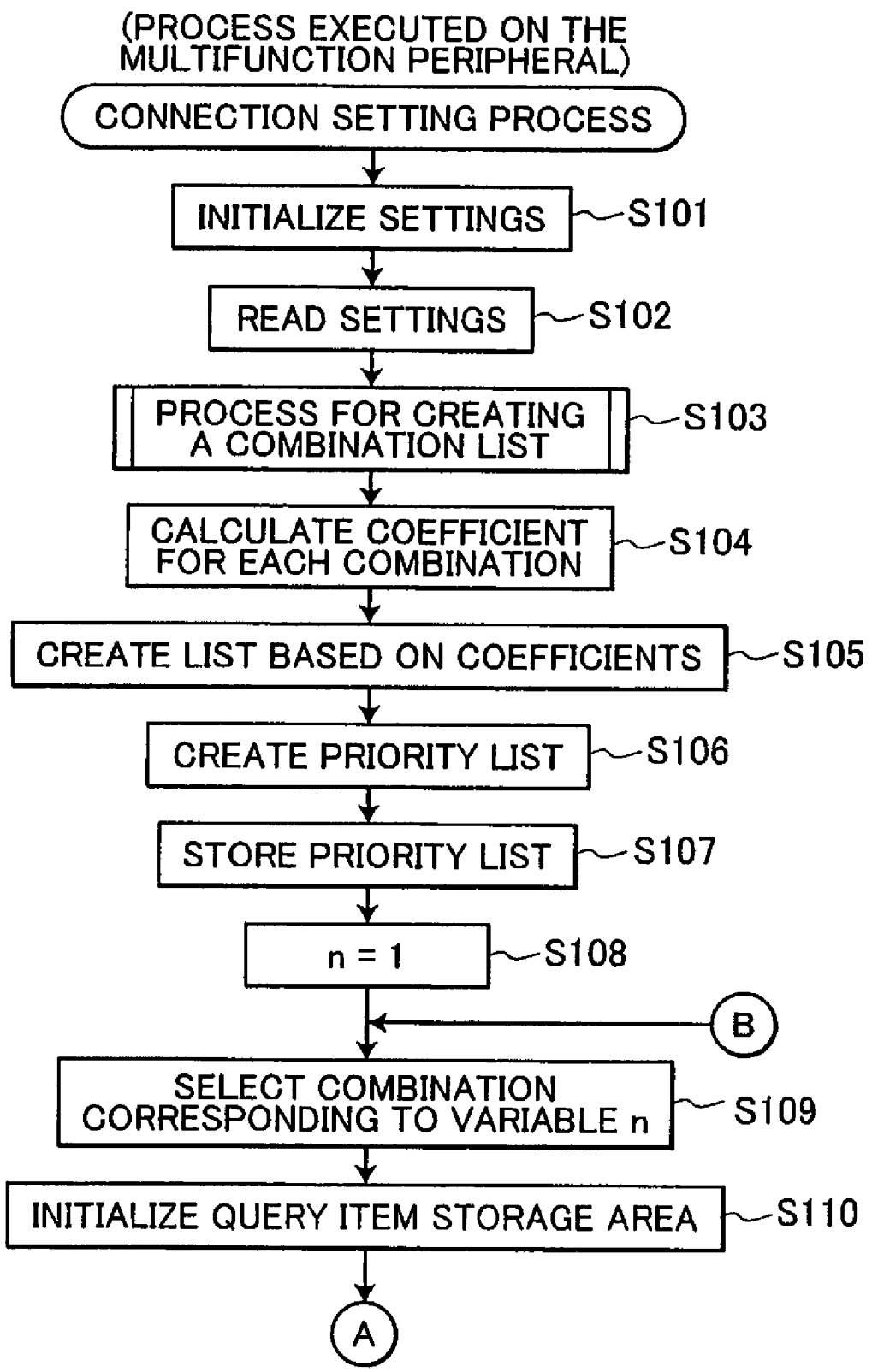
FIG. 3(a) is first half of a flowchart illustrating steps in a connection setting process executed by a CPU in the multifunction peripheral.
Figure 3B:
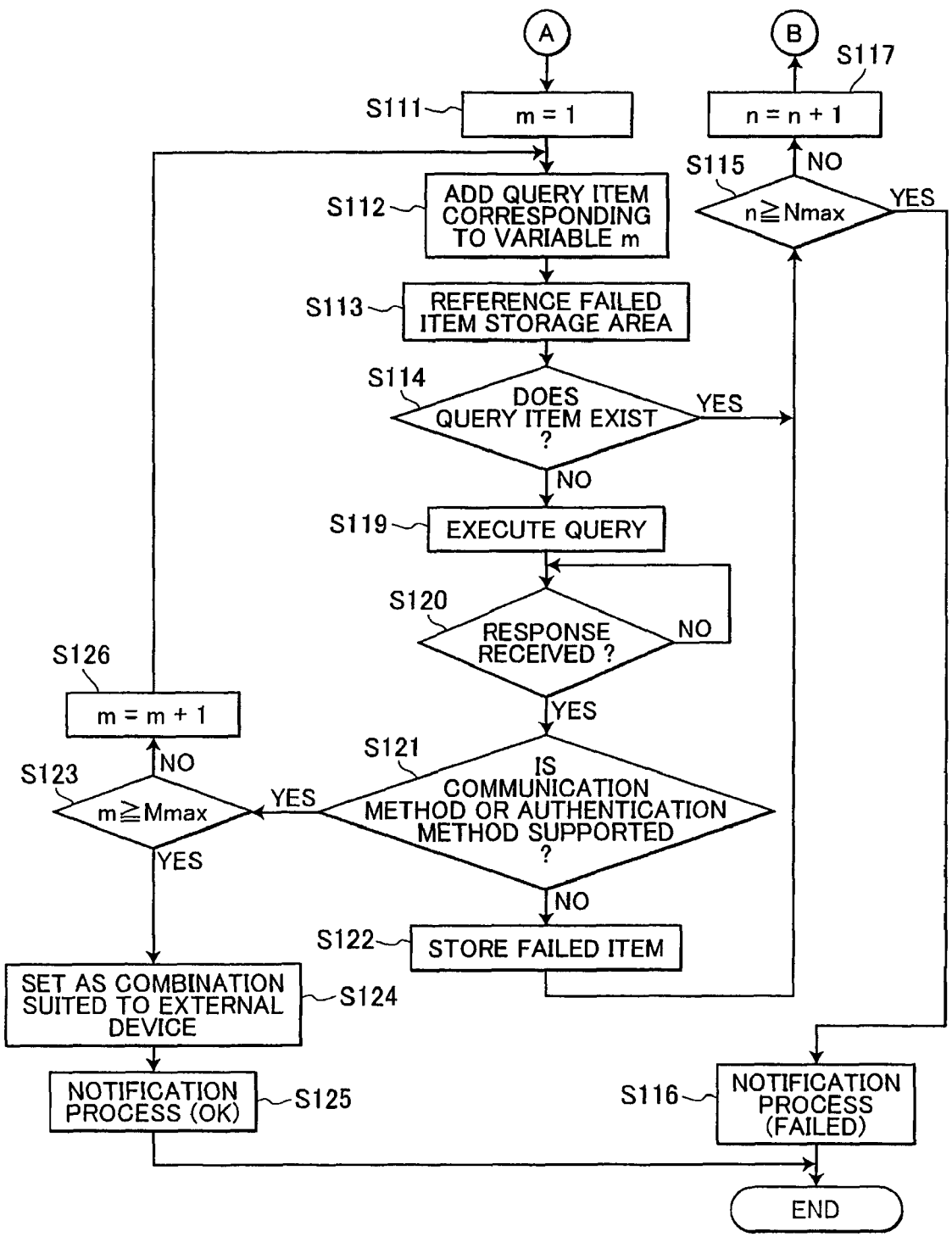
FIG. 3(b) is last half of the flowchart illustrating steps in a connection setting process executed by a CPU in the multifunction peripheral.

FIGS. 3(a) and 3(b) show a flowchart illustrating steps in a connection setting process executed by the CPU 21 in the multifunction peripheral 1. In S101 at the beginning of the connection setting process, the CPU 21 initializes unnecessary settings data. More specifically, in S101 the CPU 21 stores an initial value, such as "0", in the priority list storage area 23a, the inquiry storage area 23b, and the failed item storage area 23c.

After initialization, in S102 the CPU 21 reads various settings described below and in S103 executes a combination creating process for creating a list of combinations based on the settings read in S102.

The settings that the CPU 21 reads in S102 include connection formula data stored in the connection formula data storage area 22a, the SMTP connection table stored in the SMTP connection table storage area 22b, the PbS table stored in the PbS table storage area 22c, and the priority table stored in the priority table storage area 22d.

Here, the content of the various data read from the ROM 22 in S102 will be described with reference to FIG. 4(a)-4(d).

FIG. 4(a) is an explanatory diagram conceptually illustrating connection formula data stored in the connection formula data storage area 22a. The connection formula data shown in FIG. 4(a) includes connection formulas used to create a priority list. In the embodiment, this data includes connection formulas 1-6. As shown in FIG. 4(a), connection formula 1 is "SMTP connection=SMTP: communication method * SMTP: authentication method." This indicates that it is necessary for an SMTP connection to set a communication method (SMTP: communication method) and an authentication method (SMTP: authentication method) and that the priority list is created by multiplying coefficients of the communication method and the authentication method.

Connection formula 2 is "SMTP: communication method= (SMTP: SSL v3, SMTP: SSL v2, SMTP: plain text communications)," indicating that the SMTP communication method can be selected from one of the three types SSL v3 (SMTP: SSL v3), SSL v2 (SMTP: SSL v2), and plain text communications (SMTP: plain text communications).

Connection formula 3 is "SMTP: authentication method= (SMTP: MD5 authentication, SMTP: plain authentication, SMTP: POP before SMTP)," indicating that the SMTP authentication method can be selected from the three types MD5 authentication (SMTP: MD5 authentication), plain authentication (SMTP: plain authentication), and authentication using the POP before SMTP method (SMTP: POP before SMTP).

Connection formula 4 is "SMTP: POP before SMTP=POP: communication method * POP authentication method." This indicates that a POP communication method (POP: communication method) and a POP authentication method (POP: authentication method) must be set for POP before SMTP (SMTP: POP before SMTP) and that a priority list related to POP before SMTP is created by multiplying coefficients of the communication method and the authentication method.

Connection formula 5 is "POP: communication method= (POP: SSL v3, POP: SSL v2, POP: plain text communications)," indicating that the POP communication method can be selected from among the three types SSL v3 (POP: SSL v3), SSL v2 (POP: SSL v2), and plain text communications (POP: plain text communications).

Connection formula 6 is "POP: authentication method= (POP: APOP authentication, POP: plain authentication)," indicating that the POP authentication method can be selected from the two types APOP authentication (POP: APOP authentication) and plain authentication (POP: plain authentication).

A priority list configured of a plurality of communication methods or authentication methods can be easily modified simply by modifying the elements (communication method or authentication method) multiplied in connection formulas 1 and 4, or by increasing or decreasing the elements in connection formulas 2, 3, 5, and 6. Hence, the system flexibly supports additions to the communication and authentication methods and modifications in the priority list.

FIG. 4(b) is an explanatory diagram conceptually illustrating an SMTP connection table stored in the SMTP connection table storage area 22b. The SMTP connection table shown in FIG. 4(b) correlates the SMTP communication methods and the SMTP authentication methods with their coefficients. In the embodiment, the SSL v3 communication method is assigned the coefficient 1.0, the SSL v3 communication method the coefficient 0.5, and the plain text communications communication method 0.1. The MD5 authentication method is assigned the coefficient 1.0, and plain authentication the coefficient 0.5. The POP before SMTP authentication method is configured of the PbS table shown in FIG. 4(c).

FIG. 4(c) is an explanatory diagram conceptually illustrating a PbS table stored in a PbS table storage area 22c. The PbS table shown in FIG. 4(c) shows the POP before SMTP authentication method in detail. This table provides correlations between the POP communication methods or authentication methods and their coefficients. In the embodiment, the communication method SSL v3 is assigned the coefficient 0.7, SSL v2 the coefficient 0.3, and plain text communications the coefficient 0.1. The APOP authentication method is assigned the coefficient 0.7, and plain authentication the coefficient 0.3.

In the SMTP connection table and the PbS table, larger coefficients assigned to the communication and authentication methods indicate a higher priority. While coefficients are set based on the level of security and versatility of the methods in the embodiment, the user can modify these coefficients to set suitable priorities by using the operating keys 40 and the LCD 41, for example.

Figures 4D, 5:
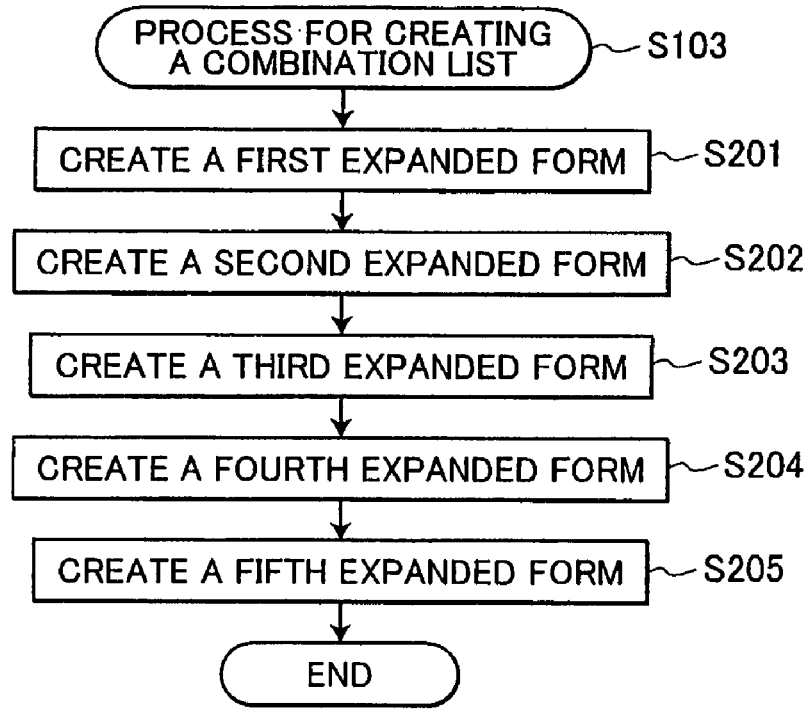
FIG. 4(d) is an explanatory diagram conceptually illustrating a priority table stored in a priority table storage area.
FIG. 5 is a flowchart illustrating steps in a combination list creating process executed during the connection setting process of FIG. 3(a)

FIG. 4(d) is an explanatory diagram conceptually illustrating a priority table stored in the priority table storage area 22d. The priority table shown in FIG. 4(d) shows correlations between all communication methods and authentication methods used in the connection setting process of the multifunction peripheral 1 and their priorities. In the embodiment, a value 1 of the priority indicates the highest priority and 4 the lowest. As shown in the table, SMTP: SSL v3 has a priority of 3, SMTP: SSL v2 a priority of 3, SMTP: plain text communications a priority of 3, SMTP: MD5 authentication a priority of 4, SMTP: plain authentication a priority of 4, POP: SSL v3 a priority of 1, POP: SSL v2 a priority of 1, POP: plain text communications a priority of 1, POP: APOP authentication a priority of 2, and POP: plain authentication a priority of 2.

Since the communication and authentication methods shown in FIG. 4(a)-4(d) are well known in the art, a detailed description of these methods has been omitted herein. These communication and authentication methods are merely an example. Other communication and authentication methods may be used.

Next, the combination list creating process executed in S103 will be described with reference to FIG. 5. FIG. 5 is a flowchart illustrating steps in the combination list creating process executed in the connection setting process.

In S201 at the beginning of the combination list creating process, the CPU 21 creates a first expanded form of the SMTP connection based on connection formula 1 ("SMTP connection=SMTP: communication method * SMTP: authentication method"), connection formula 2 ("SMTP: communication method=(SMTP: SSL v3, SMTP: SSL v2, SMTP: plain text communications)"), and connection formula 3 ("SMTP: authentication method=(SMTP: MD5 authentication, SMTP: plain authentication, SMTP: POP before SMTP)").

Hence, the first expanded form created in S201 is SMTP connection=(SMTP: SSL v3, SMTP: SSL v2, SMTP: plain text communications) * (SMTP: MD5 authentication, SMTP: plain authentication, SMTP: POP before SMTP). In other words, the first expanded form is created by substituting connection formulas 2 and 3 into connection formula 1.

In S202 the CPU 21 creates a second expanded form based on the first expanded form created in S201 and connection formula 4 ("SMTP: POP before SMTP=POP: communication method * POP authentication method").

Hence, the second expanded form created in S202 is SMTP connection=(SMTP: SSL v3, SMTP: SSL v2, SMTP: plain text communications) * (SMTP: MD5 authentication, SMTP: plain authentication, POP: communication method * POP authentication method). In other words, the second expanded form is created by substituting connection formula 4 for SMTP: POP before SMTP in the first expanded form.

In S203 the CPU 21 creates a third expanded form based on the second expanded form created in S202, connection formula 5 ("POP: communication method=(POP: SSL v3, POP: SSL v2, POP: plain text communications)"), and connection formula 6 ("POP: authentication method=(POP: APOP authentication, POP: plain authentication)").

Hence, the third expanded form created in S203 is SMTP connection=(SMTP: SSL v3, SMTP: SSL v2, SMTP: plain text communications) * (SMTP: MD5 authentication, SMTP: plain authentication, (POP: SSL v3, POP: SSL v2, POP: plain text communications) * (POP: APOP authentication, POP: plain authentication)). In other words, the third expanded form is created by substituting connection formulas 5 and 6 for "POP: communication method * POP: authentication method" in the second expanded form.

In S204 the CPU 21 creates a fourth expanded form by developing the part "(POP: SSL v3, POP: SSL v2, POP: plain text communications) * (POP: APOP authentication, POP: plain authentication)" of the third expanded form. The parenthesis is expanded by obeying the following rules: (A * (B, C))=(A * B, A * C) and ((A, B) * C)=(A * C, B * C), where A, B, and C show the communication method or the authentication method, for example SMTP: SSL v3, or SMTP: MD5 authentication.

Hence, the fourth expanded form created in S204 is SMTP connection=(SMTP: SSL v3, SMTP: SSL v2, SMTP: plain text communications) * (SMTP: MD5 authentication, SMTP: plain authentication, (POP: SSL v3 * POP: APOP authentication, POP: SSL v3 * POP: plain authentication, POP: SSL v2 * POP: APOP authentication, POP: SSL v2 * POP: plain authentication, POP: plain text communications * POP: APOP authentication, POP: plain text communications * POP: plain authentication)).

In S205 the CPU 21 creates a fifth expanded form by expanding the entire fourth expanded form. The fifth expanded form is obtained as follows.
SMTP Connection=(SMTP: SSL v3 * SMTP: MD5 authentication, SMTP: SSL v3 * SMTP: plain authentication, SMTP: SSL v3 * POP: SSL v3 * POP: APOP authentication, SMTP: SSL v3 * POP: SSL v3 * POP: plain authentication, SMTP: SSL v3 * POP: SSL v2 * POP: APOP authentication, SMTP: SSL v3 * POP: SSL v2 * POP: plain authentication, SMTP: SSL v3 * POP: plain text communications * POP: APOP authentication, SMTP: SSL v3 * POP: plain text communications * POP: plain authentication, SMTP: SSL v2 * SMTP: MD5 authentication, SMTP: SSL v2 * SMTP: plain authentication, SMTP: SSL v2 * POP: SSL v3 * POP: APOP authentication, SMTP: SSL v2 * POP: SSL v3 * POP: plain authentication, SMTP: SSL v2 * POP: SSL v2 * POP: APOP authentication, SMTP: SSL v2 * POP: SSL v2 * POP: plain authentication, SMTP: SSL v2 * POP: plain text communications * POP: APOP authentication, SMTP: SSL v2 * POP: plain text communications * POP: plain authentication, SMTP: plain text communications * SMTP: MD5 authentication, SMTP: plain text communications * SMTP: plain authentication, SMTP: plain text communications * POP: SSL v3 * POP: APOP authentication, SMTP: plain text communications * POP: SSL v3 * POP: plain authentication, SMTP: plain text communications * POP: SSL v2 * POP: APOP authentication, SMTP: plain text communications * POP: SSL v2 * POP: plain authentication, SMTP: plain text communications * POP: plain text communications * POP: APOP authentication, SMTP: plain text communications * POP: plain text communications * POP: plain authentication)

Each term constituting the fifth expanded form created in S205 is a combination configured from the plurality of communication and authentication methods and corresponds to one of combinations 1-24.

More specifically, the combinations 1-24 are created as follows:
combination 1=SMTP: SSL v3 * SMTP: MD5 authentication
combination 2=SMTP: SSL v3 * SMTP: plain authentication
combination 3=SMTP: SSL v3 * POP: SSL v3 * POP: APOP authentication
combination 4=SMTP: SSL v3 * POP: SSL v3 * POP: plain authentication
combination 5=SMTP: SSL v3 * POP: SSL v2 * POP: APOP authentication
combination 6=SMTP: SSL v3 * POP: SSL v2 * POP: plain authentication
combination 7=SMTP: SSL v3 * POP: plain text communications * POP: APOP authentication
combination 8=SMTP: SSL v3 * POP: plain text communications * POP: plain authentication
combination 9=SMTP: SSL v2 * SMTP: MD5 authentication
combination 10=SMTP: SSL v2 * SMTP: plain authentication
combination 11=SMTP: SSL v2 * POP: SSL v3 * POP: APOP authentication
combination 12=SMTP: SSL v2 * POP: SSL v3 * POP: plain authentication
combination 13=SMTP: SSL v2 * POP: SSL v2 * POP: APOP authentication
combination 14=SMTP: SSL v2 * POP: SSL v2 * POP: plain authentication
combination 15=SMTP: SSL v2 * POP: plain text communications * POP: APOP authentication
combination 16=SMTP: SSL v2 * POP: plain text communications * POP: plain authentication
combination 17=SMTP: plain text communications * SMTP: MD5 authentication
combination 18=SMTP: plain text communications * SMTP: plain authentication
combination 19=SMTP: plain text communications * POP: SSL v3 * POP: APOP authentication
combination 20=SMTP: plain text communications * POP: SSL v3 * POP: plain authentication
combination 21=SMTP: plain text communications * POP: SSL v2 * POP: APOP authentication
combination 22=SMTP: plain text communications * POP: SSL v2 * POP: plain authentication
combination 23=SMTP: plain text communications * POP: plain text communications * POP: APOP authentication
combination 24=SMTP: plain text communications * POP: plain text communications * POP: plain authentication Thus, in the embodiment, the combinations 1-24 are created as the combination list. Each combination includes the communication and authentication methods. After creating the fifth expanded form in S205, the CPU 21 ends the combination list creating process and returns to the connection setting process to execute S104.

In S104 of the connection setting process, the CPU 21 references the SMTP connection table (see FIG. 4(b)) and the PbS table (see FIG. 4(c)) to calculate a coefficient for each combination 1-24 in the fifth expanded form created in S205. The coefficients for the combinations 1-24 are calculated by referring the coefficients of the communication and authentication methods in the SMTP table and the Pbs table and by multiplying coefficients for each element, as illustrated in the example of FIG. 6.

FIG. 6 illustrates the method of calculating coefficients for the combinations 1-24. As shown in FIG. 6, the CPU 21 calculates coefficients for the combinations by multiplying the coefficients assigned to the communication method and authentication method of each combination. That is, the CPU 21 obtains all coefficients corresponding to the communication and authentication method in the combination by referring to the SMTP connection table and the Pbs table, and multiplies the all the coefficients in the combination. In other words, the CPU 21 substitutes a coefficient into the communication or authentication methods corresponding to the coefficient by referring to the SMTP connection table and the Pbs table, multiplies all the coefficients in the combination, and obtains the coefficient for the combination.

By performing the multiplications for combinations 1-24 in this example, the CPU 21 obtains a coefficient of 1.0 for combination 1, 0.5 for combination 2, 0.49 for combination 3, 0.21 for combination 4, 0.21 for combination 5, 0.09 for combination 6, 0.07 for combination 7, 0.03 for combination 8, 0.5 for combination 9, 0.25 for combination 10, 0.245 for combination 11, 0.105 for combination 12, 0.105 for combination 13, 0.045 for combination 14, 0.035 for combination 15, 0.015 for combination 16, 0.1 for combination 17, 0.05 for combination 18, 0.049 for combination 19, 0.021 for combination 20, 0.021 for combination 21, 0.009 for combination 22, 0.007 for combination 23, and 0.003 for combination 24.

In S105 of the connection setting process, the CPU 21 creates a list based on the coefficients for the combinations 1-24 calculated in S104. FIG. 7 shows an example of a list created in S105.

FIG. 7 is an explanatory diagram showing a list created based on the calculated coefficients. As shown in FIG. 7, the combinations 1-24 have been sorted in order from largest coefficient to smallest. A variable n of 1-24 has been assigned to each of the combinations 1-24 based on the new order. That is, as the variable n is increased, the calculated coefficient is decreased.

In other words, the CPU 21 rearranges the combinations in order from highest priority to lowest priority. The variable n indicates the priority of the combination. As the value n is increased, the priority is decreased. That is, n=1 indicates the highest priority, and n=24 indicates the lowest priority, in this embodiment.

More specifically, in S105 the combinations 1-24 correspond to n=1-24 as follows.

n=1 is assigned to SMTP: SSL v3 * SMTP: MD5 authentication.

n=2 is assigned to SMTP: SSL v3 * SMTP: plain authentication.

n=3 is assigned to SMTP: SSL v2 * SMTP: MD5 authentication.

n=4 is assigned to SMTP: SSL v3 * POP: SSL v3 * POP: APOP authentication.

n=5 is assigned to SMTP: SSL v2 * SMTP: plain authentication.

n=6 is assigned to SMTP: SSL v2 * POP: SSL v3 * POP: APOP authentication.

n=7 is assigned to SMTP: SSL v3 * POP: SSL v3 * POP: plain authentication.

n=8 is assigned to SMTP: SSL v3 * POP: SSL v2 * POP: APOP authentication.

n=9 is assigned to SMTP: SSL v2 * POP: SSL v3 * POP: plain authentication.

n=10 is assigned to SMTP: SSL v2 * POP: SSL v2 * POP: APOP authentication.

n=11 is assigned to SMTP: plain text communications * SMTP: MD5 authentication.

n=12 is assigned to SMTP: SSL v3 * POP: SSL v2 * POP: plain authentication.

n=13 is assigned to SMTP: SSL v3 * POP: plain text communications * POP: APOP authentication.

n=14 is assigned to SMTP: plain text communications * SMTP: plain authentication.

n=15 is assigned to SMTP: plain text communications * POP: SSL v3 * POP: APOP authentication.

n=16 is assigned to SMTP: SSL v2 * POP: SSL v2 * POP: plain authentication.

n=17 is assigned to SMTP: SSL v2 * POP: plain text communications * POP: APOP authentication.

n=18 is assigned to SMTP: SSL v3 * POP: plain text communications * POP: plain authentication.

n=19 is assigned to SMTP: plain text communications * POP: SSL v3 * POP: plain authentication.

n=20 is assigned to SMTP: plain text communications * POP: SSL v2 * POP: APOP authentication.

n=21 is assigned to SMTP: SSL v2 * POP: plain text communications * POP: plain authentication.

n=22 is assigned to SMTP: plain text communications * POP: SSL v2 * POP: plain authentication.

n=23 is assigned to SMTP: plain text communications * POP: plain text communications * POP: APOP authentication.

n=24 is assigned to SMTP: plain text communications * POP: plain text communications * POP: plain authentication.

In S106 of FIG. 3(a), the CPU 21 creates a priority list based on the list created in S105 and the priority table (see FIG. 4(d)). In S107 the CPU 21 stores this priority list in the priority list storage area 23a of the RAM 23. FIG. 8 shows an example of a priority list created in S106.

FIG. 8 is a table conceptually illustrating a priority list stored in the priority list storage area 23a of the RAM 22. As shown in FIG. 8, the list created in S106 associates each of the communication and authentication methods (query items) in the list created in S105 with a variable m having a value between 1 and 3. The list is created by referencing the priority table and associating the variable m=1-3 to each method in order from highest priority. That is, the CPU 21 refers the priority table, and assigns the variable m to the communication and authentication methods in the combination from highest priority (smallest value of a variable m) to lowest priority (highest value of a variable m).

For example, if a combination includes any of POP: SSL v3, POP: SSL v2, or POP: plain text communications that have a highest priority (1) in the priority table, the variable m for this method is set to 1. Further, if the combination includes any one of POP: SSL v3, POP: SSL v2, or POP: plain text communications and any one of POP: APOP authentication or POP: plain authentication that have a second priority (2) in the priority table, then the variable m is set to 1 for the former method and 2 for the latter method. Further, if the combination does not include any of POP: SSL v3, POP: SSL v2, and POP: plain text communications, does not include any of POP: APOP authentication or POP: plain authentication, but includes only both of SMTP: SSL v3 and SMTP: MD5 authentication, then the variable m is set to 1 for SMTP: SSL v3 and 2 for SMTP: MD5 authentication. If the combination includes 3 methods, the variable m is set to 3 for the remaining method.

In the present embodiment, when n=1, the variable m is set to 1 for SMTP: SSL v3, and 2 for SMTP: MD5 authentication.

When n=2, the variable m is set to 1 for SMTP: SSL v3, and 2 for SMTP: plain authentication.

When n=3, the variable m is set to 1 for SMTP: SSL v2, and 2 for SMTP: MD5 authentication.

When n=4, the variable m is set to 1 for POP: SSL v3, 2 for POP: APOP authentication, 3 for SMTP: SSL v3.

When n=5, the variable m is set to 1 for SMTP: SSL v2, 2 for SMTP: plain authentication.

When n=6, the variable m is set to 1 for POP: SSL v3, 2 for POP: APOP authentication, and 3 for SMTP: SSL v2.

When n=7, the variable m is set to 1 for POP: SSL v3, 2 for POP: plain authentication, and 3 for SMTP: SSL v3.

When n=8, the variable m is set to 1 for POP: SSL v2, 2 for POP: APOP authentication, and 3 for SMTP: SSL v3.

When n=9, the variable m is set to 1 for POP: SSL v3, 2 for POP: plain authentication, and 3 for SMTP: SSL v2.

When n=10, the variable m is set to 1 for POP: SSL v2, 2 for POP: APOP authentication, and 3 for SMTP: SSL v2.

When n=11, the variable m is set to 1 for SMTP: plain text communications, and 2 for SMTP: MD5 authentication.

When n=12, the variable m is set to 1 for POP: SSL v2, 2 for POP: plain authentication, and 3 for SMTP: SSL v3.

When n=13, the variable m is set to 1 for POP: plain text communications, 2 for POP: APOP authentication, and 3 for SMTP: SSL v3.

When n=14, the variable m is set to 1 for SMTP: plain text communications, and 2 for SMTP: plain authentication.

When n=15, the variable m is set to 1 for POP: SSL v3, 2 for POP: APOP authentication, and 3 for SMTP: plain text communications.

When n=16, the variable m is set to 1 for POP: SSL v2, 2 for POP: plain authentication, and 3 for SMTP: SSL v2.

When n=17, the variable m is set to 1 for POP: plain text communications, 2 for POP: APOP authentication, and 3 for SMTP: SSL v2.

When n=18, the variable m is set to 1 for POP: plain text communications, 2 for POP: plain authentication, and 3 for SMTP: SSL v3.

When n=19, the variable m is set to 1 for POP: SSL v3, 2 for POP: plain authentication, and 3 for SMTP: plain text communications.

When n=20, the variable m is set to 1 for POP: SSL v2, 2 for POP: APOP authentication, and 3 for SMTP: plain text communications.

When n=21, the variable m is set to 1 for POP: plain text communications, 2 for POP: plain authentication, and 3 for SMTP: SSL v2.

When n=22, the variable m is set to 1 for POP: SSL v2, 2 for POP: plain authentication, and 3 for SMTP: plain text communications.

When n=23, the variable m is set to 1 for POP: plain text communications, 2 for POP: APOP authentication, and 3 for SMTP: plain text communications.

When n=24, the variable m is set to 1 for POP: plain text communications, 2 for POP: plain authentication, and 3 for SMTP: plain text communications.

As will be described later, in the connection setting process the CPU 21 selects a combination from the combination list in order of the smallest variable n, and further selects one of the communication method and the authentication method from the selected combination in order of smallest variable m.

The correlations between the combinations 1-24 in the combination list and the variables n=1-24 are performed based on the results of multiplying the coefficients assigned to each communication method and authentication method.

Hence, the process of setting priorities for the plurality of combinations in the combination list is facilitated by multiplying coefficients assigned to each communication and authentication method. Further, when new communication or authentication methods are added, the priorities are easily calculated and set simply by assigning coefficients to the new methods, making the system flexible in supporting the addition of communication and authentication methods.

Next, in S108 the CPU 21 sets the variable n to 1. In S109 the CPU 21 selects the combination of communication and authentication methods corresponding to this variable n as the combination of communication and authentication methods used to query the computer on the network. Since the variable n is 1 at this time, the combination "SMTP: SSL v3, SMTP: MD5 authentication" is selected (see FIG. 8).

Once a combination corresponding to the variable n has been selected as the combination for querying the computer, in S110 the CPU 21 initializes the data stored in the inquiry storage area 23*b*. The data in the inquiry storage area 23*b* is initialized in S110 because a new combination corresponding to the variable n has been set and, therefore, the query items for querying the computer on the network must be initialized.

After initializing the inquiry storage area 23*b*, in S111 (see FIG. 3(*b*)) the CPU 21 sets the variable m to 1 and advances to S112. By setting the variable m to 1 in S111, the CPU 21 selects one of the communication method or authentication method having the highest priority in the combination set in S109. Since the variable n is 1 and the variable m is 1 at this time, the query item is set to "SMTP: SSL v3" (see FIG. 8).

In S112 the CPU 21 adds the communication method and authentication method corresponding to the variable m to the query items stored in the inquiry storage area 23*b* clarifying the adding order. Since the variable m is 1 and the inquiry storage area 23*b* is in its initial state at this time, "SMTP: SSL v3" is added to a null query item, and "SMTP: SSL v3" is stored in the inquiry storage area 23*b*. If the variable n is 1 and the variable m is 2, for example, then "SMTP: MD5" would be added to "SMTP: SSL v3" already stored in the inquiry storage area 23*b* so that "SMTP: SSL v3, SMTP: MD5" would be stored in the inquiry storage area 23*b* as the sequence of query items.

Hence, in S112 query items for querying a computer on the network in S119 described later are stored in the inquiry storage area 23*b* based on the current values of the variables n and m. If there is a sequence of items for querying a computer on the network, then the order of items in the sequence is also stored.

After storing query items in the inquiry storage area 23*b* in S112, in S113 the CPU 21 references the failed items stored in the failed item storage area 23*c* to determine whether query items in the inquiry storage area 23*b* are stored in the failed item storage area 23*c*.

After referencing the failed items stored in the failed item storage area 23*c* in S113, in S114 the CPU 21 determines whether the query items stored in the inquiry storage area 23*b* are also stored in the failed item storage area 23*c*.

That is, the CPU 21 determines whether one of the sequences of query items stored in the failed item storage area 23*c* matches the sequence of query items stored in the inquiry storage area 23*b*.

The failed item storage area 23*c* stores the order (sequence) of the items that have not been supported on the computer. For example, if the sequence "SMTP: SSL v3, SMTP: MD5" is stored in the failed item storage area 23*c*, it indicates that the computer has supported "SMTP: SSL v3", but has not supported "SMTP: MD5".

In other words, in the process of S112 and S113, the CPU 21 confirms whether there are any failed items that have been used to query the computer on the network in S119 and determined to be unsupported by the computer. The CPU 21 also confirms whether the order of elements (query items) is supported when the query items are configured of a plurality of communication and authentication methods. That is, the CPU 21 also determines whether the order of the items in the failed item storage area 23*c* corresponds to the order of the query items stored in the inquiry storage area 23*b*.

In S114, the CPU 21 determines the items and its order in the inquiry storage area 23*b* respectively corresponds to the items and its order in one of the sequence in the failed item storage area 23*c*. However, the CPU 21 may determine whether query items in the sequence of query items stored in the inquiry storage area 23*b* corresponds to a sub-combination of one of the sequence of the query items stored in the failed item storage area 23*c*. Or, the CPU 21 may determine whether the currently stored query item in the inquiry storage area 23*b* in S112 corresponds to the last query item of one of the sequences in the failed item storage area 23*c*. Or, in S114, If the CPU 21 determines in S114 that a query item stored in the inquiry storage area 23*b* is also stored in the failed item storage area 23*c* (S114: YES), signifying that a query item stored in the inquiry storage area 23*b* has been previously determined to be a failed item, then the CPU 21 advances to S115 without performing a query with the combination including this query item. However, if the query item stored in the inquiry storage area 23b is not stored in the failed item storage area 23c (S114: NO), then the CPU 21 advances to S119 to execute a query with this query item.

In S115 the CPU 21 determines whether the combination of the communication method and authentication method set in S109 is the final combination. Specifically, the CPU 21 determines whether the value of the variable n is greater than or equal to a value Nmax (=24 in the embodiment). Nmax is the number of combinations in the present embodiment.

If the variable n is greater than or equal to Nmax (S115: YES), then in S116 the CPU 21 executes a notification process (failed notification) since a combination of communication and authentication methods supported by the computer on the network has not been extracted, and ends the connection setting process. The notification process in S116 consists of displaying a message "Setting failed" on the LCD 41 and outputting the message "Setting failed" through the speaker 74.

However, if the variable n is less than Nmax (S115: NO), then in S117 the CPU 21 increments the variable n by 1 to specify the next combination of communication and authentication methods and repeats the above process from S109 (FIG. 3(a)). Since the variable n is now 2, the process from S109 is executed for the combination "SMTP: SSL v3", and SMTP: plain authentication."

In S119 the CPU 21 initiates communications with the computer on the network using the communication and authentication method corresponding to the query items that constitutes the sequence stored in the inquiry storage area 23b, executing each query in the sequence to determine whether the query items are supported by the computer.

After transmitting a query to the computer on the network, in S120 the CPU 21 determines whether the multifunction peripheral 1 has completed reception of a response to the query from the computer and continues to wait while the query response has not been received (S120: NO).

When a response to the query has been received from the computer on the network (S120: YES), in S121 the CPU 21 determines from the response whether the communication method and authentication methods is supported by the computer (OK or failed). The CPU 21 advances to S123 if the query response is OK (S121: YES), that is, the computer supports all the query items in the sequence stored in the inquiry storage area 23b. The CPU 21 advances to S122 if the query response is failed (S121: NO).

Upon advancing to S122, the CPU 21 stores the query items in the failed item storage area 23c as a failed item since at least one of the communication and authentication methods used for querying the computer on the network in S119 has not been supported by the computer. That is, the CPU 21 copies the sequence in the inquiry storage area 23b to the failed item storage area 23c. In other words, the CPU 21 stores the query items in the failed item storage area 23c as a failed item if the communication and the authentication methods, or its order stored in the inquiry storage area, has not been supported by the computer. More specifically, if the sequence of query items in the inquiry storage area 23b do not corresponds to any sequences of the items stored in the failed item storage area 23c, the CPU 21 copies the sequence of query items in the query item storage area 23b to the failed item storage area 23c. When the inquiry storage area 23b stores only single item, that is, m=1, the CPU 21 copies the single item to the failed item storage area 23c as a sequence of the item. Subsequently, the CPU 21 advances to S115.

Hence, if the query response received from the computer on the network is failed (S121: NO) in the embodiment, the CPU 21 increments the variable n by 1 to select the next combination if the current combination is not the final combination (S115: NO). Therefore, if a currently set combination is configured of a plurality of communication and authentication methods, and if the computer on the network does not support at least one of the communication and authentication method in the combination, the CPU 21 can advance to the next combination without executing queries for all communication and authentication methods in the combination, thereby reducing the number of queries made to the computer on the network. That is, if the computer on the network does not support at least one of the communication and authentication methods corresponding to the query item in inquiry storage area 23b, the CPU 21 proceeds to a next combination regardless of the currently set value of the variable m. Accordingly, the multifunction peripheral 1 can quickly extract a combination of communication and authentication methods supported by the computer on the network, reducing the control load on the CPU 21.

When the communication and authentication methods used to query the computer on the network are supported by the computer, the CPU 21 advances to S123. Subsequently, the CPU 21 determines whether a query has been performed for all communication and authentication methods constituting the combination. Specifically, the CPU 21 determines whether the variable m is greater than or equal to a value Mmax (2 or 3 in the embodiment. The value of Mmax is set to either 2 or 3 based on the number of communication and authentication methods constituting the combination when setting the combination associated with variable n in S109.

If the variable m is greater than or equal to Mmax (S123: YES), indicating that the combination of communication and authentication methods used to query the computer on the network has been performed for all communication and authentication methods constituting the combination, in S124 the CPU 21 sets (stores) the combination stored in the inquiry storage area 23b as the connection setting suited to the computer on the network that has been queried, and in S125 executes a notification process (OK notification). Subsequently, the CPU 21 ends the connection setting process. The notification process of S125 consists of displaying the message "Setting complete" on the LCD 41 and outputting the message "Setting complete" through the speaker 74.

However, if the variable m is less than Mmax (S123: NO), indicating that the combination of communication and authentication methods used to query the computer on the network has not been performed for all communication and authentication methods constituting the combination, in S126 the CPU 21 increments the variable m, and repeats to S112. In S112 CPU 21 adds a new item corresponding to the communication method or authentication method having the next highest priority (next smallest variable m) in the currently set combination to the inquiry storage area 23b, and the process described above is repeated using the query items stored in the inquiry storage area 23b.

In the connection setting process described above, the multifunction peripheral 1 creates a combination of communication and authentication methods based on coefficients and priorities assigned to the communication and authentication methods and queries the computer on the network using these combinations in order of highest priority (smallest variable n). Further, as long as there are still combinations of communication and authentication methods, the multifunction peripheral 1 selects the combinations in order until a combination of communication and authentication methods supported by the computer on the network is found. Further, if the query results for a combination of communication and authentication methods failed previously, the multifunction peripheral 1 advances to the next combination without querying the computer with a combination including this communication method and authentication method. Hence, the multifunction peripheral 1 not only gives priority to combinations based on security and versatility, but also removes combinations including combinations previously determined to have failed from the available selections. Accordingly, the multifunction peripheral 1 can quickly extract combinations of communication and authentication methods supported by the computer on the network, reducing the control load on the CPU 21.

First Modification of the Embodiment

In the embodiment, in S122, the CPU 21 stores the sequence of the query items in the failed item storage area 23c if the communication and authentication methods used for querying the computer has not been supported. Thus, if the sequence of the query items stored in the inquiry storage area 23b corresponds to the sequence of query items stored in the failed item storage area 23c, that is, the sequence of items that have been previously failed, the multifunction peripheral 1 does not query the computer on the network with this combination. However, in S122, the multifunction peripheral 1 may store a query item that is determined to be unsupported on the computer, instead of the sequence of the query items. That is, the multifunction peripheral 1 is configured to store query items, each of which corresponds to one of a communication method and an authentication method previously determined to have failed, in the failed item storage area 23c and to not query the computer on the network with a combination when the item corresponding to variable m in the combination matches an item stored in the failed item storage area 23c. In other words, when the query item previously determined to have failed is included in a combination, the multifunction peripheral 1 does not query the computer with this combination, regardless of priority (order).

For example, in the embodiment, if the computer on the network does support "SMTP: SSL v3" but does not support "SMTP: SSL v3, SMTP: MD5 authentication", the CPU 21 stores "SMTP: SSL v3, SMTP: MD5 authentication" in the failed item storage area 23c. However, in the first modification, the CPU 21 stores only "SMTP: MD5 authentication" that is determined to be an unsupported method on the computer in the failed item storage area 23c.

Second Modification of the Embodiment

The multifunction peripheral 1 according to the embodiment does not query the computer on the network when one of the sequence of query items stored in the failed item storage area 23c matches the sequence of query items stored in the inquiry storage area 23b. However, the multifunction peripheral 1 may be configured to not query the computer on the network when one sequence of items has stored in the failed item storage area 23c matches at least part of the sequence stored in the inquiry storage area 23b.

Third Modification of the Embodiment

Further, the multifunction peripheral 1 according to the embodiment described above does not query the computer on the network when one of the sequences stored in the failed item storage area 23c matches the sequence stored in the inquiry storage area 23b, even when the combination includes POP before SMTP. However, the multifunction peripheral 1 may be configured to query the computer on the network whenever the combination includes POP before SMTP. With this configuration, the CPU 21 determines after S112 whether the combination includes at least one of the communication or authentication methods constituting POP before SMTP. That is, the CPU 21 determines whether the combination includes one of POP: SSL v3, POP: SSL v2, and POP: plain text communications and includes one of POP: APOP authentication and the POP: plain authentication. If the combination includes one of POP: SSL v3, POP: SSL v2, and POP: plain text communications and includes one of POP: APOP authentication and the POP: plain authentication, the CPU 21 skips S113 and S114 and advances to S119.

For example, it is conceivable that the computer on the network does not support a combination configured of the communication or authentication method using the POP before SMTP, for example "POP: SSL v3, POP: APOP authentication", but supports a combination configured of the POP before SMTP and another communication or authentication method, for example "POP: SSL v3, POP: APOP authentication, SMTP: SSL v2". Thus, it is not always true that all combinations including the POP before SMTP are unsupported by the computer on the network. In this modification, since the CPU 21 always queries the computer whether a combination is supported on the computer when the combination includes the communication method or authentication method including POP before SMTP, the combination supported by the computer is appropriately determined.

Fourth Modification of the Embodiment

The multifunction peripheral 1 according to the embodiment described above initializes the failed data stored in the failed item storage area 23c in S101 of the connection setting process. However, the multifunction peripheral 1 may be configured to store the failed item data in the EEPROM 24 after completing the connection setting process and to reference this failed item data when subsequently executing the connection setting process. With this configuration, the failed item data is preferably stored in association with the computer on the network that has been queried.

Fifth Modification of the Embodiment

In the embodiment described above, the computer on the network is a server capable of transmitting and receiving e-mail, such as a POP server or an SMTP server. However, the connection setting process of the embodiment may be implemented when establishing a connection with another multifunction peripheral or computer connected to the multifunction peripheral 1 via the Internet or a computer connected to the multifunction peripheral 1 via a cable (or wirelessly). With this configuration, the multifunction peripheral 1 executes the connection setting process by reading the connection formulas and tables corresponding to the computer for which a connection is to be established.

While the invention has been described in detail with reference to the above embodiment thereof, it would be apparent to those skilled in the art that various changes and modifications may be made therein without departing from the spirit of the invention.

What is claimed is:

1. A data processing device capable of being connected to and communicating with an external device having at least one predetermined communication/authentication method, the data processing device comprising a control unit comprising:
- a processing unit;
- a first storing unit storing a plurality of first type combinations, each first type combination having a plurality of first type methods including a communication method and an authentication method, the communication method and the authentication method are used for establishing communications with the external device;
- a non-transitory medium having instructions stored thereon that, when executed by the processing unit, cause the control unit to function as:
  - a coefficient assigning unit assigning a coefficient to each first type method;
  - a calculating unit calculating a value for each first type combination based on coefficients assigned to first type methods in the each first type combination;
  - a first assigning unit assigning a first level of priority to each first type combination based on the value, the first level including a plurality of grades from highest grade to lowest grade;
  - a first selecting unit selecting a first type combination from the plurality of first type combinations one at a time in order from the highest grade to the lowest grade of the first level;
  - an initiating unit initiating communications with the external device using a first type method in a first type combination selected by the first selecting unit as setting data to establish communications with the external device;
  - a first determining unit determining whether a first type method in a first type combination selected by the first selecting unit corresponds to at least one communication/authentication method for the external device based on a result of communications with the external device initiated by the initiating unit;
  - a setting unit setting each first type method in a first type combination selected by the first selecting unit as valid method for communications with the external device when the first determining unit determines that each first type method in a first type combination selected by the first selecting unit corresponds to at least one communication/authentication method for the external device;
  - a second determining unit determining whether at least one of a plurality of first type methods in a first type combination currently selected by the first selecting unit corresponds to a prescribed method that has been determined to be out of conformance with the communication/authentication method for the external device by the first determining unit; and
  - a canceling unit canceling the selection of a first type combination selected by the first selecting unit when the second determining unit determines that at least one of a plurality of first type methods in the first type combination selected by the first selecting unit corresponds to the prescribed method.

2. The data processing device as claimed in claim 1, wherein the instructions cause the control unit to function as:
- a second assigning unit assigning a second level of priority to each first type method in each first type combination, the second level including a plurality of grades from highest grade to lowest grade; and
- a second selecting unit selecting a first type method in a first type combination selected by the first selecting unit in order of the second level from highest grade;

wherein the initiating unit uses the first type method in order of a first type method selected by the second selecting unit; and
the first determining unit performs a determination in order of a first type method selected by the second selecting unit.

3. The data processing device as claimed in claim 2, further comprising a second storing unit storing a first type method assigned with a highest grade of the second level as the prescribed method when the first determining unit determines that the first type method assigned with the highest grade of the second level is out of conformance with the communication/authentication method for the external device.

4. The data processing device as claimed in claim 3, wherein the second storing unit stores a second type combination of first type methods when the first determining unit determines that a first type method in a first type combination selected by the first selecting unit is out of conformance with the communication/authentication method for the external device, wherein the second type combination is a sub-combination of the first type combination selected by the first selecting unit,
wherein the second determining unit determines whether a sub-combination of a first type combination currently selected by the first selecting unit corresponds to a second type combination stored in the second storing unit.

5. The data processing device as claimed in claim 4, wherein a second type combination includes first type methods that have been selected by the second selecting unit,
wherein the second storing unit stores an order of the second level from highest grade among the first type methods in the second type combination, and
wherein the second determining unit determines whether an order of the second level from highest grade among a first type methods in a sub-combination of a first type combination selected by the first selecting unit corresponds to an order of a second level from highest grade among first type methods in a second type combination.

6. The data processing device as claimed in claim 1, wherein at least one first type combination further includes a plurality of second type methods, each second type method corresponding to one of a sub-communication method and a sub-authentication method,
wherein the instructions cause the control unit to function as:
- a second assigning unit assigning a second level of priority to each one of a first type method and a second type method in each first type combination, the second level including a plurality of grades from highest grade to lowest grade; and
- a second selecting unit selecting one of a first type method and a second type method in a first type combination selected by the first selecting unit in order of a second level from highest grade;

wherein the initiating unit initiates communications with the external device using at least one of a first type method and a second type method in order of one of a first type method and a second type method selected by the second selecting unit;
the first determining unit determines whether one of a first type method and a second type method in a first type combination selected by the first selecting unit corresponds to the at least one communication/authentication method for the external device in order of one of a first type method and a second type method selected by the second selecting unit;

the second determining unit determines whether at least one of a first type method and a second type method in a first type combination selected by the first selecting unit corresponds to the prescribed method; and the canceling unit cancels the selection of a first type combination selected by the first selecting unit when the second determining unit determines that at least one of a first type method and a second type method in the first type combination selected by the first selecting unit corresponds to the prescribed method.

7. The data processing device as claimed in claim 6, wherein a plurality of second type methods in a first type combination include both at least one sub-communication method and at least one sub-authentication method.

8. The data processing device as claimed in claim 7, wherein the second type method corresponds to POP before SMTP;
the sub-communication method corresponds to a POP communication method; and
the sub-authentication method corresponds to a POP authentication method.

9. The data processing device as claimed in claim 6, wherein a grade of a second level assigned to a second type method in a first type combination is higher than a grade of the second level assigned to a first type method in the first type combination.

10. The data processing device as claimed in claim 9, wherein the instructions cause the control unit to function as:
a third determining unit determining whether a first type combination selected by the first selecting unit includes a second type method; and
a prohibiting unit prohibiting the canceling unit from canceling the selection of a first type combination selected by the first selecting unit when the third determining unit determines that a first type combination selected by the first selecting unit includes a second type method.

11. The data processing device as claimed in claim 9, further comprising a second storing unit storing one of a first type method and a second type method assigned with a highest grade of the second level as the prescribed method when the first determining unit determines that the one of the first type method and the second type method assigned with the highest grade of the second level is out of conformance with the communication/authentication method for the external device.

12. The data processing device as claimed in claim 11, wherein the second storing unit stores a second type combination of first type methods when the first determining unit determines that a first type method in a first type combination selected by the first selecting unit is out of conformance with the communication/authentication method for the external device, wherein the second type combination is a sub-combination of the first type combination selected by the first selecting unit, and
wherein the second determining unit determines whether a sub-combination of a first type combination currently selected by the first selecting unit corresponds to a second type combination stored in the second storing unit,
wherein, when the second determining unit determines that a sub-combination of a first type combination selected by the first selecting unit corresponds to a second type combination stored in the second storing unit, the canceling unit cancels the selection of a first type combination selected by the first selecting unit.

13. The data processing device as claimed in claim 11, wherein the second storing unit stores a second type combination of second type methods when the first determining unit determines that a second type method in a first type combination selected by the first selecting unit is out of conformance with the communication/authentication method for the external device, wherein the second type combination is a sub-combination of the first type combination selected by the first selecting unit, and
wherein the second determining unit determines whether a sub-combination of a first type combination currently selected by the first selecting unit corresponds to a second type combination stored in the second storing unit,
wherein, when the second determining unit determines that a sub-combination of a first type combination selected by the first selecting unit corresponds to a second type combination stored in the second storing unit, the canceling unit cancels the selection of a first type combination selected by the first selecting unit.

14. The data processing device as claimed in claim 11, wherein the second storing unit stores a second type combination of first type methods and second type methods when the first determining unit determines that one of a first type method and a second type method in a first type combination selected by the first selecting unit is out of conformance with the at least one communication/authentication method for the external device
wherein the second type combination is a sub-combination of the first type combination selected by the first selecting unit,
wherein the second determining unit determines whether a sub-combination of a first type combination currently selected by the first selecting unit corresponds to a second type combination stored in the second storing unit,
wherein, when the second determining unit determines that a sub-combination of a first type combination selected by the first selecting unit corresponds to a second type combination stored in the second storing unit, the canceling unit cancels the selection of a first type combination selected by the first selecting unit.

15. The data processing device as claimed in claim 14, wherein a second type combination stored in the second storing unit includes first methods and second methods that have been selected by the second selecting unit,
wherein the second storing unit stores an order of the second level from highest grade among first type methods and second type methods in the second type combination, and
the second determining unit determines whether an order of the second level from highest grade among first type methods and second type methods of a sub-combination of a first type combination selected by the first selecting unit corresponds to an order of the second level from highest grade among first type methods and second type methods in a second type combination,
wherein, when the second determining unit determines that an order of the second level from highest grade among first type methods and second type methods of a sub-combination of a first type combination selected by the first selecting unit corresponds to an order of the second level from highest grade among first type methods and second type methods in a second type combination, the canceling unit cancels the selection of a first type combination selected by the first selecting unit.

16. A method for controlling a data processor capable of being connected to and communicating with an external device having at least one predetermined communication/authentication method, the data processor storing a plurality of combinations, each combination having a plurality of methods including a communication method and an authentication method, the communication method and the authentication method are for establishing communications with the external device, the method for controlling the data processor comprising:

assigning a coefficient to each method;

calculating a value for each combination based on coefficients assigned to methods in each combination;

assigning a first level of priority to each combination based on the value, the first level including a plurality of grades from highest grade to lowest grade;

selecting a combination from the plurality of combinations one at a time in order from highest grade to lowest grade of the first level;

initiating communications with the external device using a method in a combination selected in the selecting step as setting data to establish communications with the external device;

determining whether a method in a combination selected by the selecting corresponds to the at least one communication/authentication method for the external device based on a result of communications with the external device initiated by the initiating step;

setting each method in a combination selected by the selecting as valid method for communications with the external device when the determining determines that each method in the combination selected by the selecting corresponds to the at least one communication/authentication method for the external device;

determining whether at least one of a plurality of methods in a combination selected by the selecting step corresponds to a prescribed method that has been determined to be out of conformance with communication/authentication method for the external device by the previous determining step; and canceling the selection of a combination selected by the selecting when the determining determines that at least one of a plurality of methods in a combination selected by the selecting corresponds to the predetermined method.

17. A non-transitory computer-readable storage medium storing a set of program instructions executable on a data processor capable of being connected to and communicating with an external device having at least one predetermined communication/authentication method, the data processor storing a plurality of combinations, each combination having a plurality of methods including a communication method and an authentication method, the communication method and the authentication method are for establishing communications with the external device, the program instructions comprising:

assigning a coefficient to each method;

calculating a value for each combination based on coefficients assigned to methods in each combination;

assigning a first level of priority to each combination based on the value, the first level including a plurality of grades from highest grade to lowest grade;

selecting a combination from the plurality of combinations one at a time in order from highest grade to lowest grade of the first level;

initiating communications with the external device using a method in a combination selected by the selecting as setting data to establish communications with the external device;

determining whether a method in a combination selected by the selecting corresponds to the at least one communication/authentication method for the external device based on a result of communications with the external device initiated by the initiating instructions;

setting each method in a combination selected by the selecting as valid method for communications with the external device when the determining determines that each method in a combination selected by the selecting corresponds to the at least one communication/authentication method for the external device;

determining whether at least one of a plurality of methods in a combination selected by the selecting corresponds to a prescribed method that has been determined to be out of conformance with communication/authentication method for the external device by the determining instructions; and canceling the selection of a combination selected by the selecting when the determining determines that at least one of a plurality of methods selected by the selecting corresponds to the predetermined method.

* * * * *